United States Patent [19]
Mills

[11] Patent Number: 5,881,235
[45] Date of Patent: *Mar. 9, 1999

[54] REMOTELY PROGRAMMING A MOBILE TERMINAL WITH A HOME LOCATION REGISTER ADDRESS

[75] Inventor: James L. Mills, Plano, Tex.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 612,183

[22] Filed: Mar. 7, 1996

[51] Int. Cl.⁶ .............................. H04Q 7/00; G06F 9/00
[52] U.S. Cl. ................ 395/200.51; 340/825.5; 455/418; 455/419; 455/551
[58] Field of Search ............... 340/825.5; 364/514 R, 364/514 C; 379/58, 59, 63; 455/54.2, 89, 418, 419, 551; 395/200.47, 200.51

[56] References Cited

U.S. PATENT DOCUMENTS

| | | | |
|---|---|---|---|
| 5,014,345 | 5/1991 | Comroe et al. | 455/54.2 |
| 5,233,656 | 8/1993 | Langrand et al. | 380/23 |
| 5,297,191 | 3/1994 | Gerszberg | 379/59 |
| 5,297,192 | 3/1994 | Gerszberg | 379/59 |
| 5,353,328 | 10/1994 | Jokimies | 379/58 |
| 5,491,482 | 2/1996 | Dingwall et al. | 342/42 |
| 5,502,445 | 3/1996 | Dingwall et al. | 342/51 |
| 5,594,782 | 1/1997 | Zicker et al. | 455/417 |
| 5,603,084 | 2/1997 | Henry, Jr. et al. | 455/419 |
| 5,655,003 | 8/1997 | Erving et al. | 455/418 |
| 5,699,275 | 12/1997 | Beasley et al. | 395/200.51 |
| 5,722,084 | 2/1998 | Chakrin et al. | 455/551 |

FOREIGN PATENT DOCUMENTS

| | | |
|---|---|---|
| 0459065 | 6/1990 | European Pat. Off. . |
| 0478231 | 9/1991 | European Pat. Off. . |
| 562 890 A1 | 3/1993 | European Pat. Off. . |
| 0679040 | 4/1995 | European Pat. Off. . |
| 94/30023 | 12/1994 | WIPO . |
| WO9523487 | 8/1995 | WIPO . |
| WO9627270 | 9/1996 | WIPO . |
| WO9714258 | 4/1997 | WIPO . |

*Primary Examiner*—Edward R. Cosimano
*Attorney, Agent, or Firm*—Jenkens & Gilchrist

[57] ABSTRACT

A mobile terminal is sold to a mobile subscriber without encoding a particular home location register address. When the mobile subscriber turns the mobile terminal for the first time, the mobile switching center (MSC) serving the geographic area covering the mobile terminal's current location ascertains the associated HLR network address and communicates that HLR network address to the mobile terminal via a Short Message Service (SMS) message. The mobile terminal receives the SMS message, extracts the newly assigned HLR network address and stores the address in a Subscriber Identity Module (SIM) card memory register. Whenever mobile terminal identification is requested by a visited MSC, the International Mobile Subscriber Identity along with the stored HLR network address are transmitted to the visited MSC. The visited MSC analyzes the HLR network address to locate and request the necessary subscriber information from the home HLR.

21 Claims, 6 Drawing Sheets

REMOTELY PROGRAMMING A MOBILE TERMINAL WITH A HOME LOCATION REGISTER ADDRESS

BACKGROUND OF THE INVENTION

1. Technical Field of the Invention

The present invention relates to mobile telecommunications systems and, in particular, to a method and apparatus for programming a mobile terminal with an address of a Home Location Register within a mobile telecommunications network.

2. Description of Related Art

Each mobile terminal and its associated subscription is uniquely identified by a network identification such as an International Mobile Subscriber Identity (IMSI) number. The mobile terminal IMSI is used by the serving mobile telecommunications network to identify the home Public Land Mobile Network (PLMN) and the Home Location Register (HLR) storing the subscription information associated with that particular mobile terminal. Such subscription information includes billing information, subscription category, subscriber feature data, and authentication data. This subscription information is needed by the serving mobile network to properly provide mobile service to the particular mobile terminal.

As an example, in the Global System for Mobile (GSM) system, a unique IMSI number is stored in each mobile terminal as well as in its associated HLR database. Accordingly, whenever a mobile terminal travels into a foreign Mobile Service Center (MSC) area and performs an initial registration, the MSC analyzes the IMSI number received from the mobile terminal and subsequently locates the home network and the HLR to obtain the necessary subscriber information.

Due to the competitiveness in the mobile telephone service industry and the flexibility demanded by mobile customers, some telephone service providers and operators are no longer willing to pre-encode within a mobile terminal the address representing a particular HLR. Pre-encoding an HLR network address as a part of an IMSI number before the mobile terminal is registered by a particular subscriber limits its sales area and thereby restricts its marketability. For example, if a mobile terminal is encoded with an HLR network address associated with a mobile network serving the Dallas, Texas area, service providers or operators are limited to selling that particular mobile terminal only within the Dallas area. Therefore, in order to remove the logical relationship between a particular mobile terminal and a particular HLR, service providers and operators have removed the HLR network address from the pre-encoded IMSI number.

However, removing the HLR network addresses from mobile terminal IMSIs creates functional problems within the mobile telecommunications network. If there is only one HLR within a particular PLMN, an IMSI number without the HLR network address is still capable of identifying the home PLMN and the only HLR associated with that PLMN. However, with the increase of mobile subscription numbers and services, it is likely that more than one HLR is needed to effectively service a particular PLMN area. As a result, without the HLR network address, whenever mobile service is requested from a mobile terminal, each HLR within that particular PLMN indicated by the transmitted IMSI number needs to check whether the requesting subscriber information from that particular mobile terminal is stored within its database. This implies employment of a trial-and-error search tactic to eventually locate the correct HLR. Another implementation might be to introduce a centralized database within each PLMN to store data correlating each IMSI with its associated HLR. Whenever a requesting message is received, the centralized database is first queried to locate the correct HLR. However, both methods are disadvantageous and inefficient requiring additional hardware components or processing time. Alternatively, the HLR network address is encoded into the Subscriber Identity Module (SIM) card or "smart card" (hereinafter referred to as a SIM card) associated within each mobile terminal after purchasing the mobile terminal and selecting a desired service provider. This requires detaching the SIM card from the mobile terminal and physically carrying it to the service provider, and is viewed as being inconvenient and cumbersome.

Accordingly, it would be advantageous to introduce a method and apparatus for remotely programming an address of a serving HLR in a mobile terminal.

SUMMARY OF THE INVENTION

The present invention provides a method and apparatus for programming an address of the associated home location register (HLR) for a particular mobile terminal within a mobile telecommunications system. A mobile switching center (MSC) connected to a selected HLR communicates the network address representing the selected HLR to a particular mobile terminal using a message transmitted via an over-the-air communications link. The mobile terminal receives the transmitted HLR network address and stores it in a memory register located within a Subscriber Identity Module (SIM) card. Whenever the mobile subscriber initiates a service request to utilize telecommunications service and the mobile subscriber is unknown in the MSC, the IMSI number along with the stored HLR network address are requested by and transmitted to the MSC serving that particular geographic area covering the mobile terminal's current location. By analyzing the received IMSI number along with the HLR network address, the serving MSC is able to determine which HLR has the requisite subscription information regarding that particular mobile terminal.

In one aspect, the present invention provides a system for transmitting an HLR network address from a MSC toward a mobile terminal via a Short Message System (SMS) message.

In another aspect, the present invention provides a system for transmitting an HLR network address from a MSC toward a mobile terminal via an Unstructured Supplementary Service Data (USSD) message.

In still another aspect, the present invention provides a system for storing the associated HLR network address in a SIM card attached to the mobile terminal.

A still further aspect, the present invention provides a system for updating the HLR network address stored in a SIM card attached to the mobile terminal.

A still further aspect, the present invention provides a system for retrieving and transmitting the stored HLR network address from the mobile terminal to a MSC serving the current geographic area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
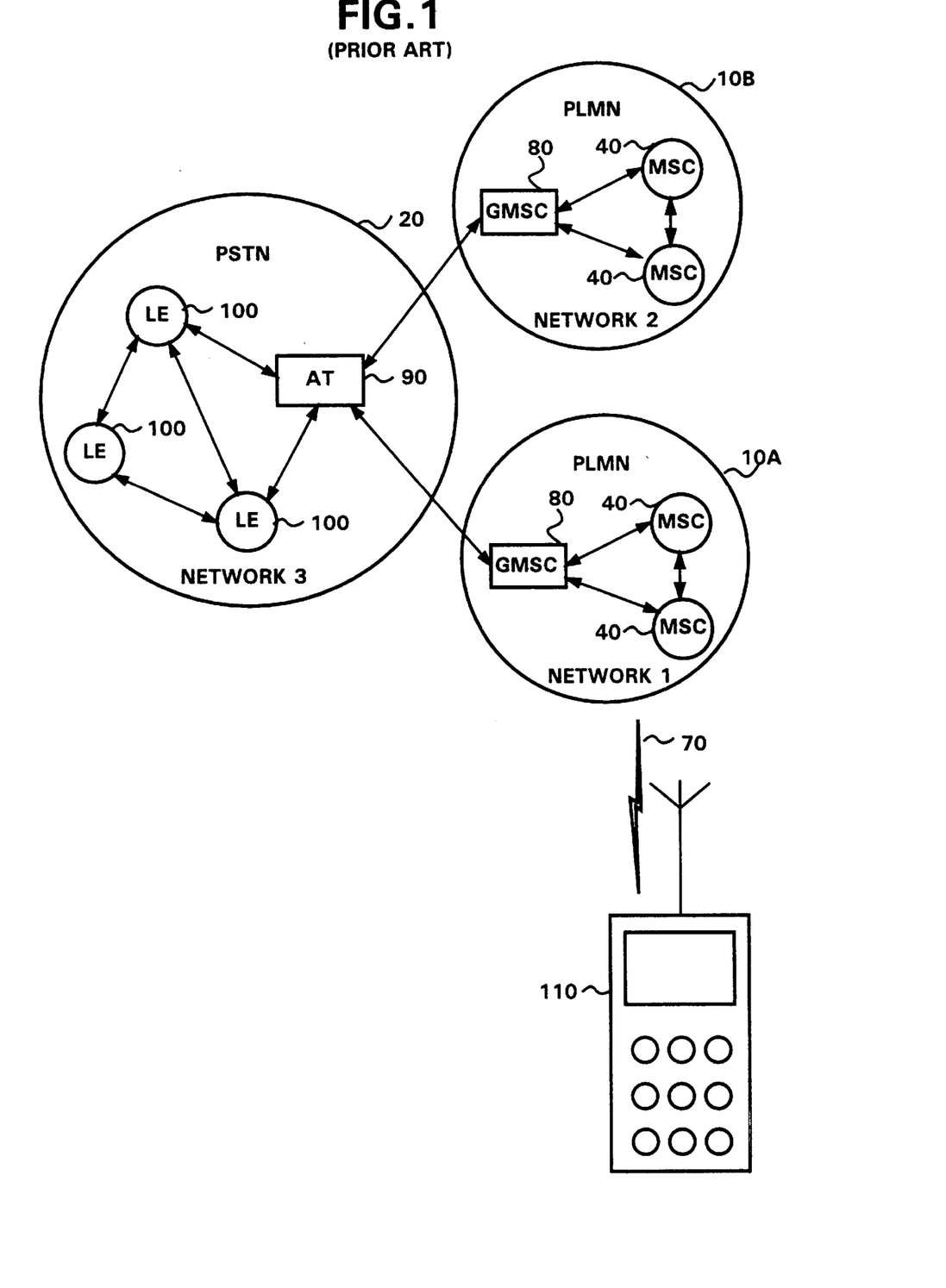
FIG. 1 is a diagram illustrating a network overview of multiple Public Land Mobile Networks (PLMN) interconnecting with a Public Switched Telephone Network (PSTN)

FIG. 1 illustrates the network interconnection of multiple Public Land Mobile Networks (PLMN) 10 to a Public Switched Telephone Network (PSTN) 20. A mobile terminal (also known as mobile station or mobile equipment) 110 is associated with one of the PLMNs 10 as the Home PLMN 10a. Within each PLMN 10, there are a number of different mobile switching centers (MSC) 40 servicing the geographic areas covered by the network. A mobile terminal 110 communicates with one of the MSCs 40 via over-the-air communications links 70. The mobile terminal 110 served by one PLMN 10a then communicates with other wireless and wire-line terminals by connecting to the Public Switched Telephone Network (PSTN) 20. The access tandem (AT) 90 within the PSTN 20 routes the mobile calls generated from the PLMN 10 to wire-line terminals serviced by one of its local exchanges (LE) 100 within the PSTN 20, or to another PLMN lob by a way of its GMSC 80.

Figure 2:
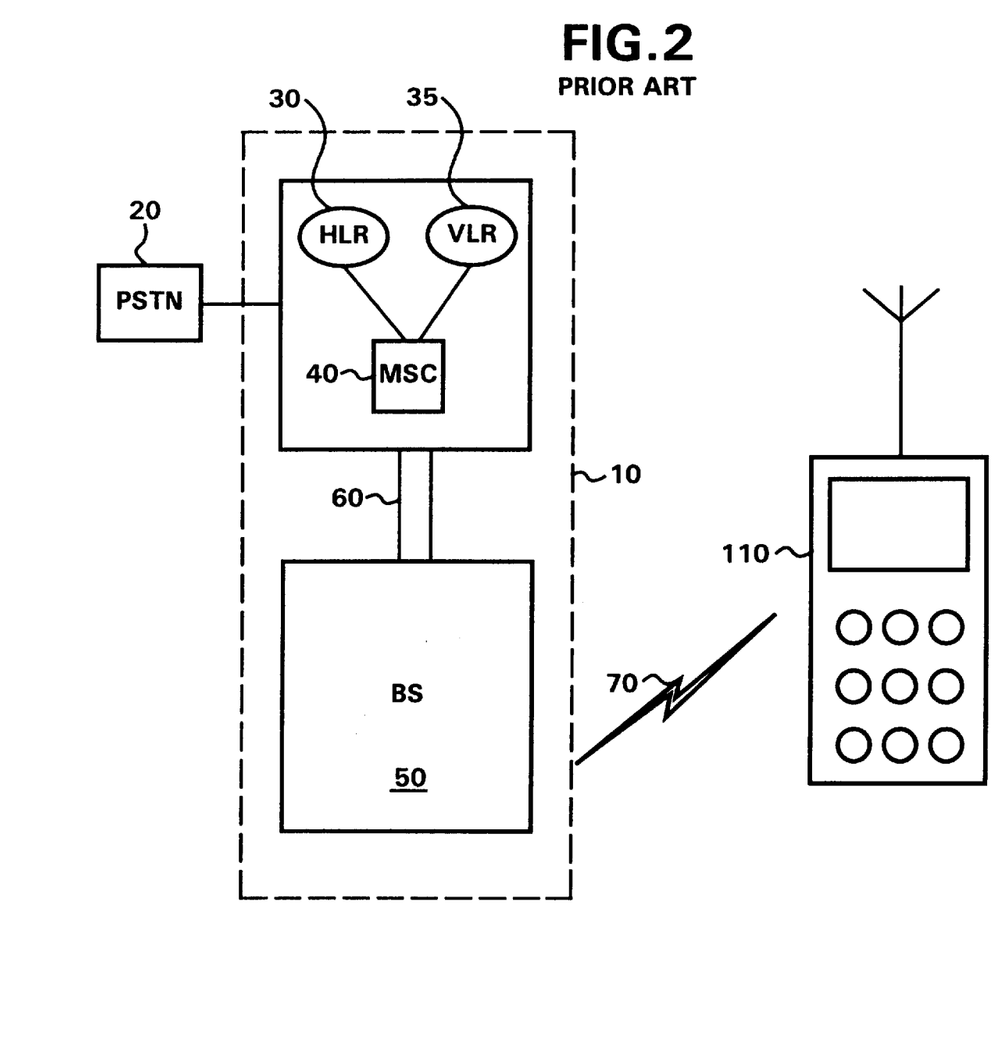
FIG. 2 is a diagram illustrating the interconnection that exists between a mobile switching center (MSC), home location register (HLR), visitor location register (VLR), and base station (BS) within a PLMN.

FIG. 2 shows a PLMN 10 in which the present invention, as will be disclosed herein, may be implemented. The PLMN 10, which is used to communicate with a mobile user, comprises a MSC 40, a home location register (HLR) 30, a visiting location register (VLR) 35, a base station (BS) 50, and a mobile terminal 110. The PLMN 10 is interfaced with a PSTN 20 to provide a communication link to other telephone subscribers. The BS 50 is connected to the MSC 40 using a digital or analog communication link 60, and communicates with a mobile terminal 110 via a radio channel 70. The HLR 30 is a data base containing information about all "home" subscribers, their services and location. The Home subscribers are the subscribers who have registered with that particular HLR as permanent subscribers. In large networks with high subscriber densities, HLRs 30 are separate nodes. In small networks, they can be integrated in the MSC 40 as shown in FIG. 2. The BS 50 provides the communication link with a mobile terminal 110 when the mobile terminal is within the coverage area of the BS known as a cell. The MSC 40, which contains the mobile subscriber's subscription, is known as the "home MSC." If the subscriber crosses the border to another MSC area during a conversation, an interexchange handoff will take place and the adjacent MSC, known as a "visited MSC," then handles the conversation—this process is known as "roaming." Furthermore, if the mobile terminal 110 moves to another MSC area and tries to use its telecommunications service, the newly visited MSC notifies the home HLR 30 and requests confirmation data, and accordingly provides the telecommunications service to the visiting mobile terminal 110—this process is also known as "roaming." In both cases, the mobile terminal's identification is needed to ascertain the proper home PLMN and the subscription information within the mobile telecommunications network.

A call from the mobile terminal starts when the mobile subscriber first keys in the desired destination number and then presses the send button. If the mobile subscriber is within its home switch coverage area, an access channel is seized, whereupon the desired number is transmitted to the MSC 40 via the BS 50. The MSC 40 analyzes the calling subscriber's category previously retrieved from the HLR 30 to verify that the caller is permitted access to the system. The keyed destination number is also analyzed to determine if the caller is allowed to call that particular number. If all analyses are affirmative, the mobile terminal 110 is assigned to a digital voice channel 70 and the call is set up.

On the other hand, if the mobile subscriber is outside of his own MSC coverage area and is roaming in a new MSC area, the mobile terminal 110 automatically registers with the new MSC controlling the current area when the cellular unit is turned on. The visited MSC checks whether this mobile terminal 110 is already registered. If not, the visited MSC requests an International Mobile Subscriber Identity (IMSI) number from the visiting mobile terminal 110. By analyzing the received IMSI number, the visited MSC can ascertain the identity of and inform the home MSC 40 and its HLR 30 about the new position of the mobile terminal 110. The visited MSC further requests and receives necessary subscriber information from the HLR 30. The home HLR 30 notes in which service area the mobile terminal 110 is roaming to be able to reroute all incoming calls to the new MSC. The roaming subscriber may now originate and receive calls in the same manner as that used in the home MSC. All special services (call transfer, call waiting, etc.) also automatically follow the roamer.

Consequently, whenever a call is processed for a particular mobile subscriber or the subscriber moves into a different MSC coverage area, the home HLR needs to be identified, updated, and queried to properly process the call. Consequently, the address of the home HLR needs to be ascertained before any communication of subscriber information is enabled between a serving MSC and the home HLR. However, if the HLR network addresses are removed from the mobile terminals, as discussed previously, the aforementioned problems of inconvenience or requiring additional hardware components are created. Accordingly, it would be advantageous to conveniently update the mobile terminal 110 with the serving home HLR network address after the mobile terminal 110 has registered with a particular PLMN.

With the development of the Global System for Mobile (GSM) and the Personal Communications System (PCS), a number of advanced supplementary services have been introduced. One example is the Short Message Service (SMS) System for transmitting alphanumeric characters between a serving MSC and a mobile terminal 110. Once the SMS messages transporting the alphanumeric characters are received by the mobile terminal 110, the character data are written into a buffer within a Subscriber Identity Module (SIM cards) attached to the mobile terminal 110. Such SIM stored data can later be displayed or manipulated for further application by the subscriber.

Figure 3:
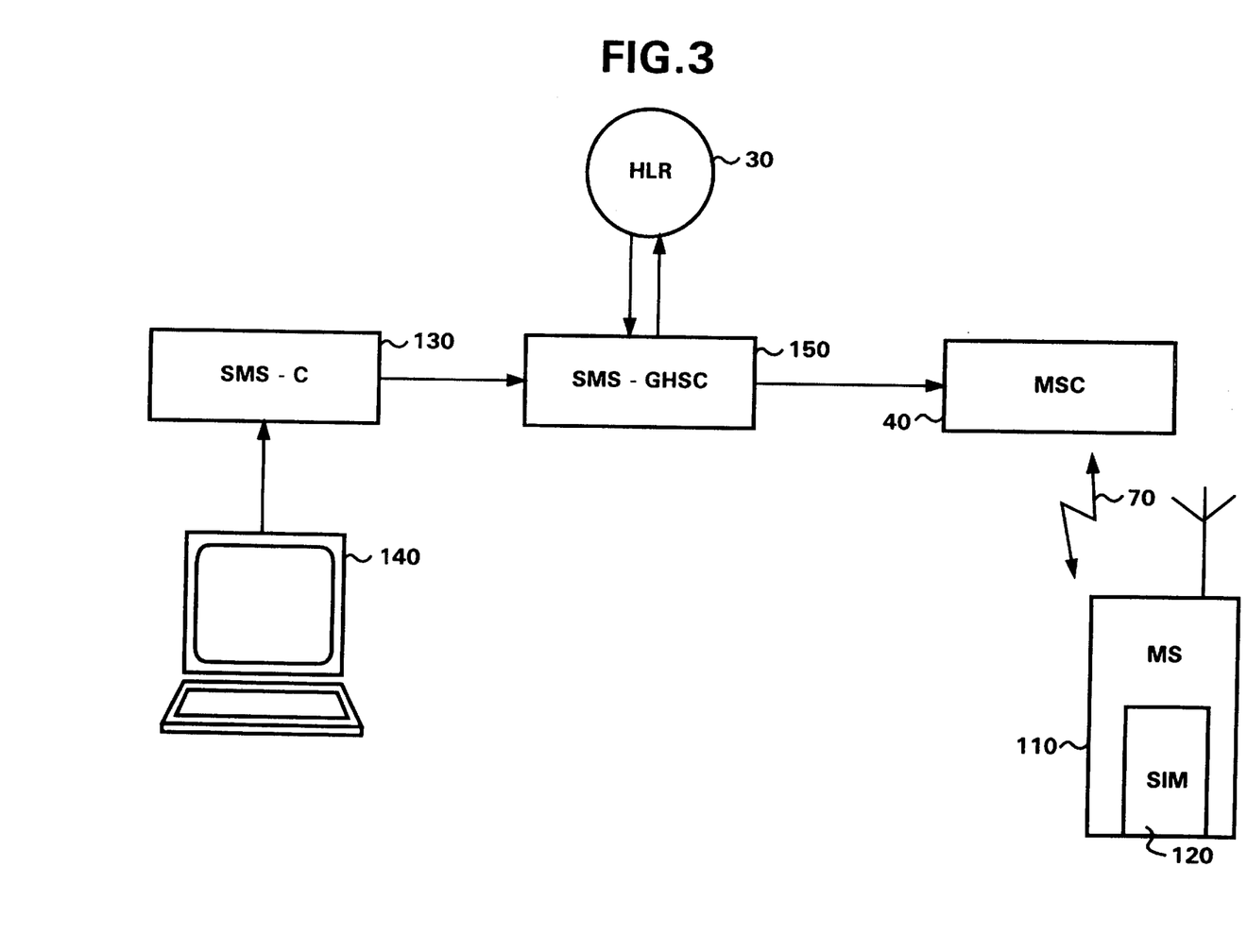
FIG. 3 is a diagram illustrating a network overview of Short Message Service (SMS) System.

Reference is now made to FIG. 3 where a block diagram illustrating the communication of an SMS message between an SMS user 140 and a SIM card 120 is shown. The SMS user 140 sends a string of alphanumeric characters to the Short Message Service Center (SMS-C) 130 to be transmitted to the mobile terminal 110. The SMS-C 130 encapsulates the character data to an SMS message and routes the message to a Short Message Service—Gateway Mobile Switching Center (SMS-GMSC) 150. The SMS-GMSC 150 interrogates the HLR 30 for routing information (where the mobile terminal 110 is currently located) and subsequently routes the message to the MSC 40 serving the mobile terminal's current location. The mobile terminal 110 is paged and a connection is set up between the mobile terminal 110 and the network, as in the normal call setup case. However, if the mobile terminal 110 is already busy, the connection setup step is not performed because the network already knows that the mobile terminal is accessible. If the connection has been successful, thereby the mobile terminal 110 is authenticated, the MSC 40 delivers the SMS message to the mobile terminal 110 over one of the control data channels. A control data channel such as a Stand-alone Dedicated Control Channel (SDCCH) is used instead of a traffic channel (TCH) to allow connection-less data communications. After receiving the SMS message encapsulating the character data, the mobile terminal 110 acts merely as a buffer and passes the data to the attached SIM card 120. The SIM card 120 accordingly stores the data into a buffer or memory device. Lastly, if the delivery has been successful, a successful delivery report is sent from the MSC 40 to the SMS-C 130. Otherwise, a failure report is instead generated.

Figure 4:
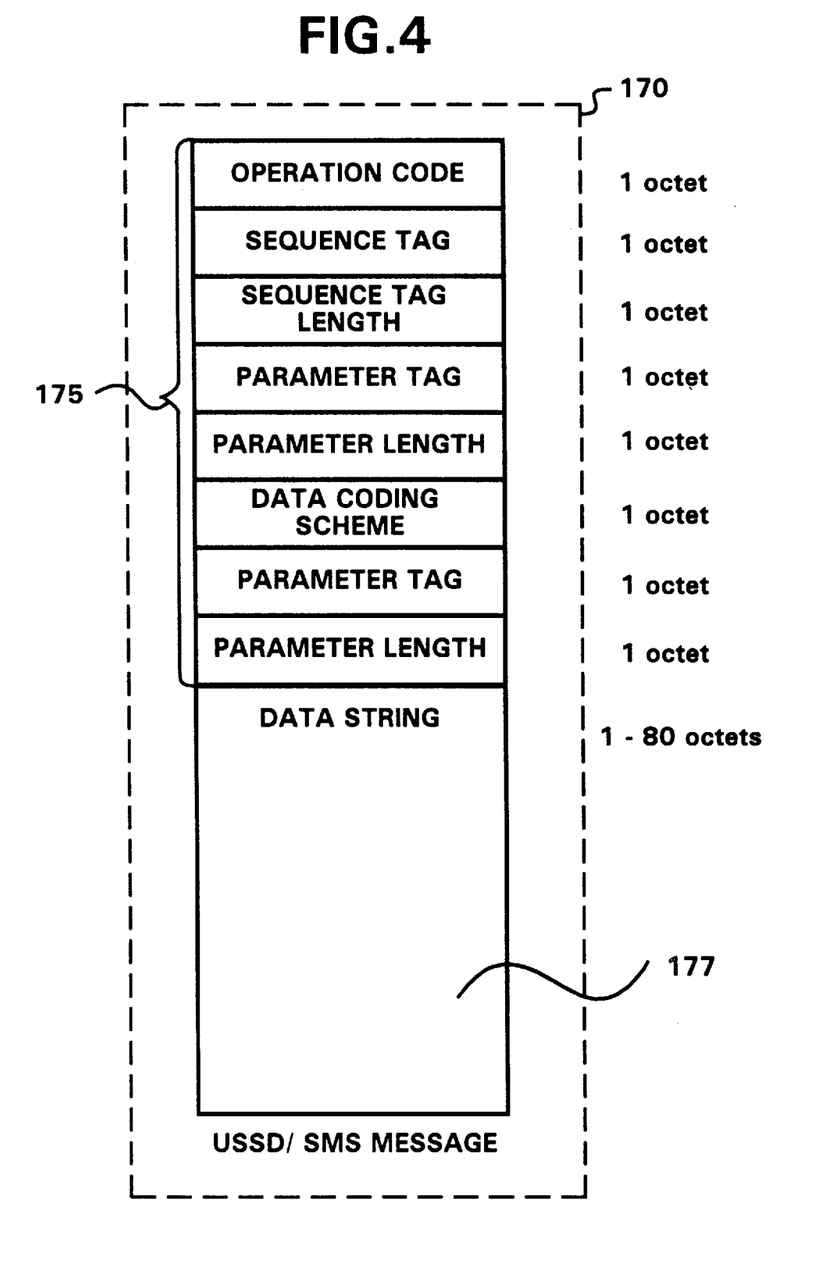
FIG. 4 is a diagram illustrating the data format of an SMS and Unstructured Supplementary Service Data (USSD) message.

Now reference is made to FIG. 4 where a block diagram illustrating the data format 170 for an SMS or USSD message is shown. USSD messages have the same structure or data format as SMS messages, encapsulate character based data, and communicate over a data channel such as an SDCCH. Even though USSD messages are normally used by different types of application services, for purposes of the present invention, both USSD and SMS messages can be utilized. As illustrated, the first eight octets 175 are used to specify which operation, application, language, parameter, data length and data sequences are being used. The remaining eighty octets 177, if needed, are used to transport alphanumeric character data. Therefore, the first eight octets comprise the header section indicating which application needs to receive the transported data, and how much and what type of data are being transported. The remaining eighty octets 177 comprise the data string section 177 and stores the actual data indicated by the header section.

In accordance with the teachings of the present invention, the above SMS or USSD message is used to transmit a selected HLR network address from a service provider toward a newly registering mobile terminal. More specifically, a selected memory register within the SIM card attached to the mobile terminal is indicated by the header section 175 and a selected HLR network address for the newly registering mobile terminal is encapsulated into the data string section 177 of an SMS or USSD message. The SMS or USSD message containing the above HLR network address data is then transmitted to the mobile terminal 110 over an SDCCH. The mobile terminal receives the SMS or USSD message, extracts the encapsulated HLR network address, and stores in the memory register. By remotely programming the newly assigned HLR address with the registering mobile terminal using a message transmitted via a over-the-air communications link, the requisite HLR address need not be pre-encoded into the mobile terminal before the terminal is registered with a particular service provider.

Figure 5:
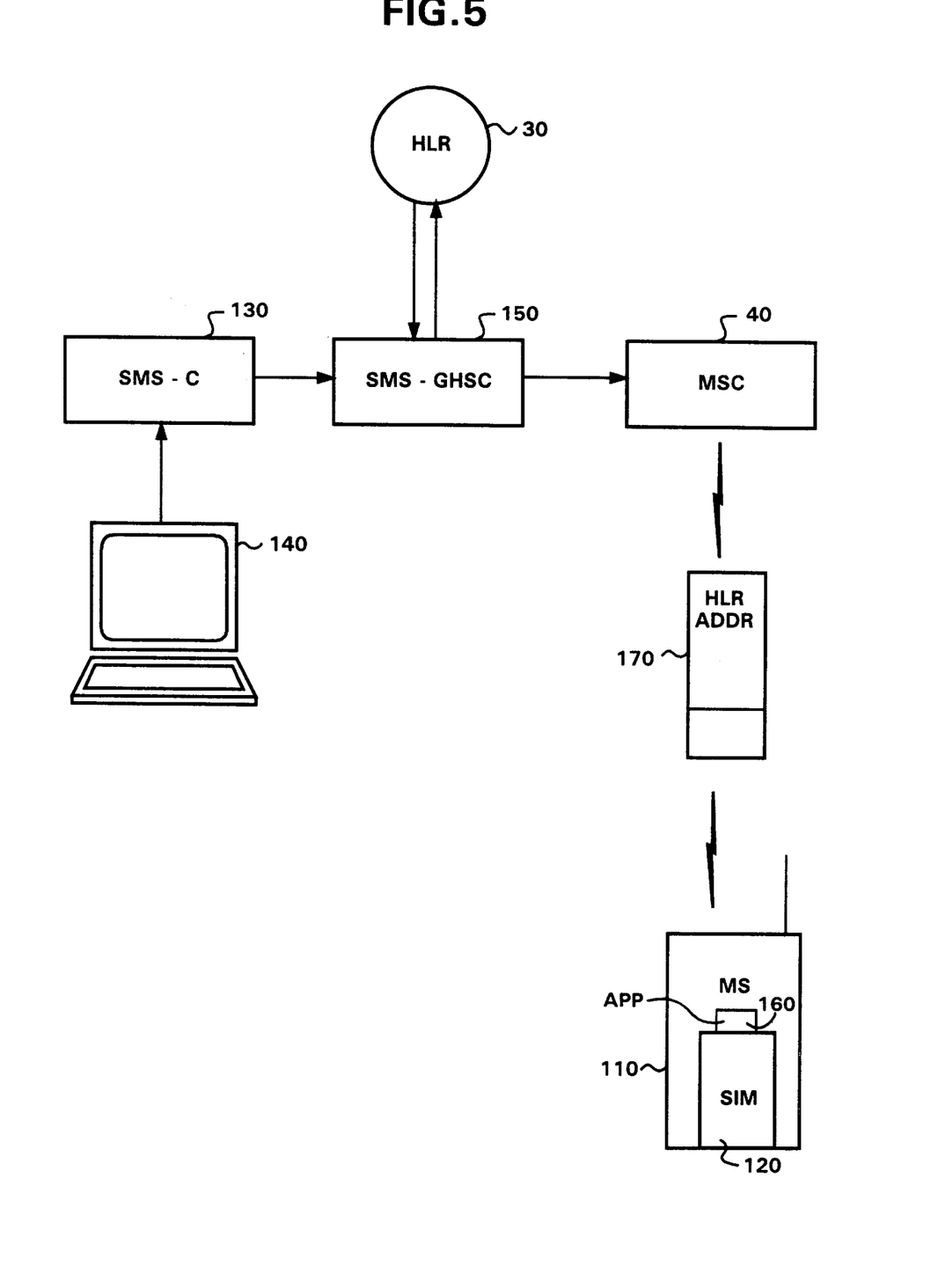
FIG. 5 is a diagram illustrating the transmission of an SMS message encapsulating an HLR network address from an SMS operator to a mobile terminal.

Reference is now made to FIG. 5 illustrating the transmission of an SMS message encapsulating an HLR network address from a service provider to a mobile terminal. When a mobile terminal 110 is turned on for the first time after being purchased by a subscriber, a service provider 140 recognizes that it is receiving a registration request from a mobile terminal 110 that has yet been assigned a Mobile Station Integrated Services Digital Network Number (MSISDN, or more commonly referred to a mobile telephone number). A registration process is automatically initiated between a service provider serving that particular area and the subscriber to create a new service subscription with that service provider. After requesting and receiving the necessary subscriber information, such as his billing address, credit card information, name, and home phone number, an MSISDN is assigned to the newly registered mobile terminal. At the same time, the service provider determines which HLR 30 is associated with the current MSC serving the mobile terminal 110 and retrieves its HLR network address. The retrieved HLR network address is then sent to the SMS-C 130 to be encapsulated by an SMS message. The SMS encapsulating the HLR network address is then routed to the SMS-GMSC 150 and subsequently re-routed to the MSC 40 currently serving the mobile terminal 110. The MSC 40 transports the SMS message 170 encapsulating the HLR network address via an SDCCH to the mobile terminal 110. The application module 160 associated with the mobile terminal receives the transmitted SMS message and stores the newly assigned HLR network address to a selected memory register within the SIM card 120. Such a HLR network address can be stored separately from the pre-encoded IMSI address using a separate register, or can override a portion of the pre-encoded IMSI number and be stored in the same memory location.

If the subscriber later relocates to a different service area covered by a different HLR, the subscriber may again initiate another registration process. Following the aforementioned registration steps, an HLR network address representing a new HLR is transmitted to the mobile terminal 110 and subsequently overrides the previously stored HLR network address in the SIM card. By updating the previous HLR network address with the new HLR network address, the distance and time for retrieving the requisite subscriber information from the home MSC is reduced. The mobile telecommunications network does not have to communicate as much as before to retrieve the needed subscriber information because the HLR is geographically closer to where the mobile terminal 110 is being used. Accordingly, by transmitting the assigned HLR network address over the air, the need to pre-encode an HLR network address within a mobile terminal has been eliminated and each mobile terminal is remotely programmed with its associated HLR without inconveniencing the subscriber.

Figure 6:
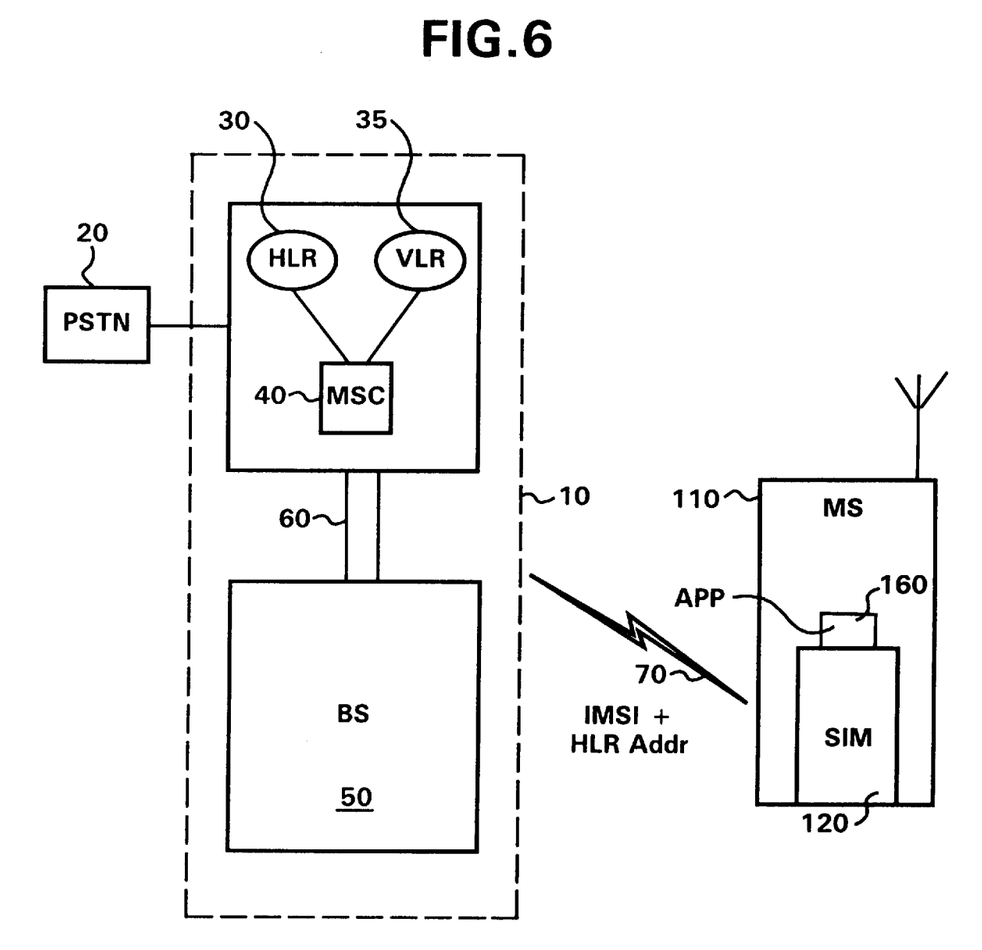
FIG. 6 is a diagram illustrating a mobile terminal transmitting an International Mobile Subscriber Identity (IMSI) number and the stored HLR network address to a serving MSC.

FIG. 6 is a diagram illustrating a mobile terminal transmitting an IMSI number along with a stored HLR network address to a serving MSC within a PLMN 10 in accordance with the teachings of the present invention. When the mobile terminal 110 turns on its power, the MSC 40 serving the geographic area covering the mobile terminal's current location determines whether the mobile terminal 110 is registered with its HLR 30. If not, the MSC 40 determines that the mobile terminal 110 is attempting to register as a roaming subscriber and accordingly requests terminal identification information from the mobile terminal 110. A new record is also created in the VLR 35 to mark the mobile terminal 110 as a roaming subscriber. As discussed previously, the actual communication with the mobile terminal 110 is established by the BS 50 serving the current cell area. In response to the MSC's request, the application module 160 having access to the SIM card 120 retrieves the stored HLR network address. The mobile terminal 110 then transmits the IMSI number as well as the retrieved HLR network address to the MSC 40 over the communications link 70. After receiving the IMSI number and the HLR network address, the MSC 40 analyzes and ascertains the home PLMN and the HLR associated with this particular mobile terminal 110. Using these data, the visited MSC 40 requests authentication and other necessary subscriber information from the home PLMN via the PSTN 20 to properly provide mobile service to the mobile terminal 110.

Accordingly, without the need to maintain a centralized database or manually encoding an HLR network address within each mobile terminal, visited MSCs can accurately and efficiently ascertain the HLR associated with each roaming subscriber by requesting and retrieving the previously stored HLR network address from each mobile terminal.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for programming a mobile terminal with a home location register (HLR) address within a Public Land Mobile Network (PLMN), said method comprising the steps of:

transmitting an address for a newly associated HLR to said mobile terminal via an over-the-air-communications system; and storing said newly associated HLR address within said mobile terminal in a memory register separate from storage of a pre-encoded International Mobile Station Identity (IMSI) number assigned to the mobile terminal, wherein the IMSI number inherently contains in a portion thereof an address value for a previously associated HRL.

2. The method of claim 1 further comprising the step of registering the mobile terminal wherein the step of registering comprises the steps of:

transmitting said IMSI number and said HLR address as retrieved from the separate memory resister to a mobile switching center (MSC) serving said mobile terminal when said MSC requests mobile identification information from said mobile terminal; and utilizing the transmitted HRL address instead of the HLR identification inherently contained within the transmitted IMSI number to locate an HLR for that mobile terminal.

3. The method of claim 1 wherein said step of transmitting said address further comprises the step of transmitting said HLR address via a Short Message Service (SMS) message.

4. The method of claim 1 wherein said step of transmitting said HLR address further comprises the step of transmitting said HLR address via an Unstructured Supplementary Service Data (USSD) message.

5. The method of claim 1 wherein said step of storing said HLR address further comprises the step of storing said HLR address in a Subscriber Identity Module (SIM) card for said mobile terminal.

6. A system for programming a mobile terminal with a home location register (HLR) address within a Public Land Mobile Network (PLMN), said system comprising:

means for transmitting an address for a newly associated HLR to said mobile terminal via an over-the-air-communications system; and means for storing said newly associated HLR address within said mobile terminal in a memory register separate from storage of a pre-encoded International Mobile Station Identity (IMSI) number assigned to the mobile terminal, wherein the IMST number inherently contains in a portion thereof an address value for a previously associated HLR.

7. The system of claim 6 further comprising means for registering the mobile terminal wherein the means for registering comprises:

means for transmitting said IMSI number and said HLR address to a mobile switching center (MSC) serving said mobile terminal when said MSC requests mobile identification information from said mobile terminal; and means for utilizing the transmitted HLR address instead of the HLR identification inherently contained within the transmitted IMSI number to locate an HLR for that mobile terminal.

8. The system of claim 6 wherein said means for transmitting said HLR address further comprises means for transmitting said HLR address via a Short Message Service (SMS) message.

9. The system of claim 6 wherein said means for transmitting said HLR address further comprises means for transmitting said HLR address via an Unstructured Supplementary Service Data (USSD) message.

10. The system of claim 6 wherein said means for storing said HLR address further comprises means for storing said HLR address in a Subscriber Identity Module (SIM) card for said mobile terminal.

11. A mobile terminal within a mobile telecommunications system, said mobile terminal associated with a home location register (HLR), said mobile terminal comprising:

a memory register located within said mobile terminal for storing a pre-encoded International Mobile Station Identity (IMSI) number including in a portion thereof an address value representing a previous HLR associated with said mobile terminal;

a receiver for receiving a new HLR address value for a new HLR associated with said mobile terminal via an over-the-air communications link; and an application module for retrieving said new HLR address value from said over-the-air communication link and storing said new HLR address value in said memory register by overwriting the portion of the IMSI number stored in the memory register with the new HLR address value.

12. The system of claim 11 wherein said memory register comprises a Subscriber Identity Module (SIM) card for said mobile terminal.

13. The system of claim 11 wherein said over-the-air communication link is a Short Message Service (SMS) system.

14. The system of claim 11 wherein said over-the-air communication link is an Unstructured Supplementary Service Data (USSD) system.

15. A method of storing in a mobile terminal an address representing a home location register (HLR), said method comprising the steps of:

transmitting an address value representing a newly associated HLR to said mobile terminal via an over-the-air-communications system; and storing said transmitted address value in a memory register located within said mobile terminal, said memory register storing a pre-encoded International Mobile Station Identity (IMSI) number including in a portion thereof an address value representing a previously associated HLR, the step of storing including the step of overwriting the portion of the stored IMST number in the memory register containing the previously associated address value with the transmitted address value representing the newly associated HLR.

16. The method of claim 15 wherein said step of transmitting said address value further comprises the step of transmitting said address value encapsulated in a Short Message Service (SMS) message.

17. The method of claim 15 wherein said step of transmitting said address value further comprises the step of transmitting said address value encapsulated in an Unstructured Supplementary Service Data (USSD) message.

18. The method of claim 15 wherein said step of storing said address value further comprises the step of storing said address value in a Subscriber Identity Module (SIM) card for said mobile terminal.

19. A system for remotely programming a home location register (HLR) address in a mobile terminal, said HLR connected to a mobile switching center (MSC), said system comprising:

a memory register located within said mobile terminal for storing a pre-encoded International Mobile Station Identity (IMSI) number including in a portion thereof an address value for a previously associated HLR;

an over-the-air communications link for communicating an address value for a newly associated HLR between said mobile terminal and said MSC; and an application module for retrieving said communicated newly associated HLR address value from said over-the-air communications link and storing said communicated newly associated HLR address value in said memory register overwriting the portion of the stored IMSI number containing the address value for the previously associated HLR.

20. The system of claim 19 wherein said memory register comprises a Subscriber Identity Module (SIM) card.

21. The system of claim 19 wherein said over-the-air communications link comprises a Short Message Service (SMS) system.

* * * * *

UNITED STATES PATENT AND TRADEMARK OFFICE
CERTIFICATE OF CORRECTION

PATENT NO. : 5,881,235
DATED : March 9, 1999
INVENTOR(S) : Mills

It is certified that error appears in the above-identified patent and that said Letters Patent is hereby corrected as shown below:

Column 3,
Line 39, replace "lob" with -- 10b --

Column 7,
Line 43, replace "HRL" with -- HLR --
Line 48, replace "resister" with -- register --
Line 52, replace "HRL" with -- HLR --

Column 8,
Line 11, replace "IMST" with -- IMSI --

Column 9,
Line 10, replace "IMST" with -- IMSI --

Signed and Sealed this

Twenty-ninth Day of January, 2002

Attest:

Attesting Officer

JAMES E. ROGAN
Director of the United States Patent and Trademark Office